Patented Oct. 2, 1951

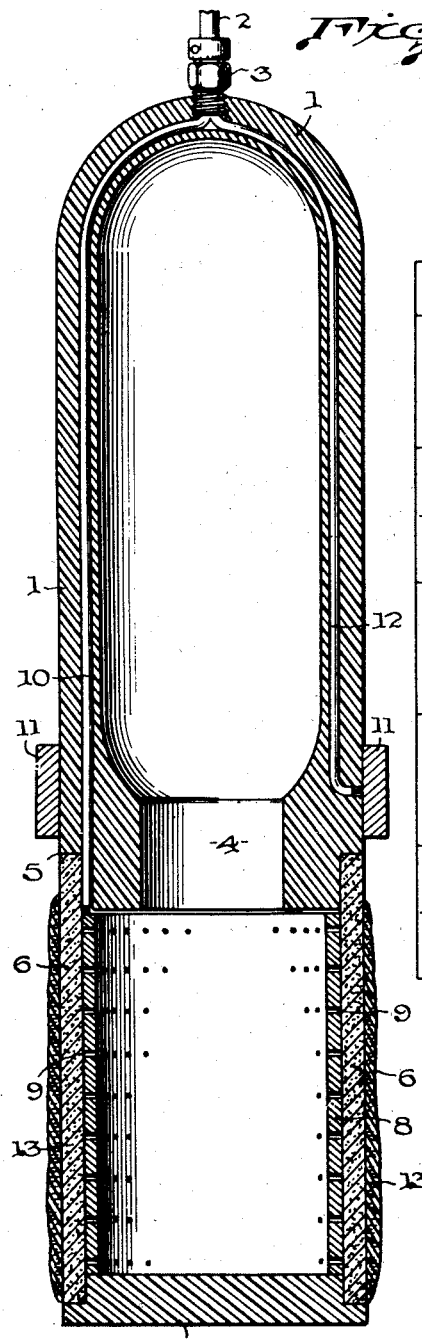
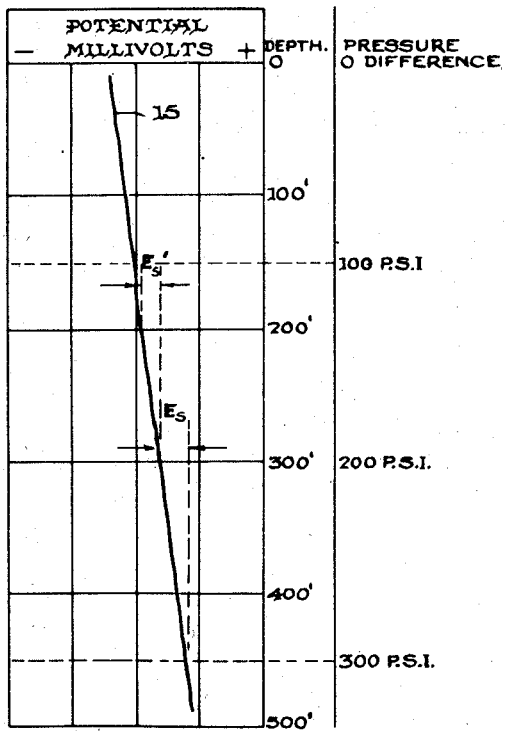

2,569,625

UNITED STATES PATENT OFFICE 2,569,625

METHOD AND APPARATUS FOR DETERMINING THE STREAMING-POTENTIAL CHARACTERISTICS OF DRILLING MUD

Malcolm R. J. Wyllie, Indiana Township, Allegheny County, Pa., assignor to Gulf Research & Development Company, Pittsburgh, Pa., a corporation of Delaware Application March 30, 1950, Serial No. 152,901

4 Claims. (Cl. 175—182)

This invention concerns a method and apparatus for use in the electric logging of boreholes and in particular concerns a method and apparatus for determining the streaming-potential characteristics of drilling mud, which knowledge is useful in the interpretation of the so-called self-potential electric log.

In the electric logging of boreholes it is customary to lower one or more electrodes into the well in order that electrical measurements may be made. One form of electric log which is customarily made is the so-called self-potential curve. The self-potential log is made by measuring the spontaneous potential difference between a non-polarizing electrode on the surface of the ground and a similar electrode lowered to various depths in the well. The source of the observed potential difference is not clearly understood in its entirety, but it is known that this potential is caused in most part by certain shale-contact cells formed at the interface between shale formations and interstitial saline water in adjacent formations and between shale and the fluid in the borehole, and is also caused in part by the streaming or electrokinetic potential induced by the flow of formation fluids radially outward from the borehole through the mud filter cake. It is apparent that only the first of these effects reflects the nature of the formations penetrated by the borehole, although both effects contribute to the identification of permeable formations.

It has been recognized that the self-potential log as customarily measured in a well which has been drilled by an ordinary rotary drill is complicated by the fact that the wall of the borehole is plastered during the drilling process with a mud cake for the purpose of holding in place loosely-consolidated formations and in order to lessen the loss of drilling fluid into porous formations. Since it is difficult and ofttimes dangerous to remove the mud cake from the wall of the borehole, it is customary to leave the mud cake in place when running a self-potential log. It is apparent however that the potential measured by the self-potential log includes also a component resulting from the streaming of the mud fluid through the mud cake under the pressure head resulting from the difference between formation pressure and mud-fluid pressure, and it is further evident that this component does not reflect the nature of the saline fluids in the formations penetrated but rather is characteristic of the particular mud employed during the drilling process and the borehole and formation pressures. By the use of my invention it is possible to determine that component of the self-potential log which is due to the streaming potential of the mud filtrate through the mud cake, whereby the operator may correct the observed self-potential log for the component thereof which is due to streaming potential of the mud and obtain a corrected self-potential log which may be used to compute the salinity of the saline waters in the formations penetrated by the borehole.

It is accordingly an object of my invention to provide a method of determining the streaming-potential characteristics of drilling mud.

It is another object of my invention to provide a method of determining a correction which may be applied to the self-potential log.

It is another object of my invention to provide a method of determining the streaming-potential characteristics of drilling mud (as a function of pressure, etc.) which requires no samples to be taken and which may be practiced with the mud in situ in the borehole.

It is another object of my invention to provide an apparatus which may be employed to determine the streaming-potential characteristics of mud filtrate when it is forced to flow through the mud filter cake.

It is another object of my invention to provide an apparatus for determining the streaming-potential characteristics of well fluid existing in the well at the time a self-potential log is made.

These and other useful objects are attained by my invention as described in the following specification of which the drawing forms a part, and in which:

Figure 1 is a longitudinal section of one form of apparatus which may be used in carrying out my invention, and Figure 2 is a graph showing the potential difference measured by the apparatus of Figure 1 plotted as a function of its depth of immersion in the mud standing in the borehole.

The streaming-potential characteristics of aqueous drilling mud varies with the chemical composition of the mud filtrate and with the nature of the weighting material suspended therein. Very little information is available on the streaming-potential characteristics of various muds, but in order to correct the self-potential log for the various types of mud employed in different areas it is desirable to have a direct and substantially simultaneously-made log of the streaming potential of the mud filtrate through the mud cake as a function of pressure and, to a lesser extent, as a function of temperature.

The method of my invention comprises lowering into the mud in the borehole a large hollow chamber into which the mud filtrate may enter by way of a porous medium under the hydrostatic well pressure. The mud filtrate passes through the porous medium and forms a filter cake on the outer surface thereof. A streaming potential is developed as a result of the flow of mud filtrate through the mud cake and the porous medium, but since the permeability of the cake is very much less than that of the porous medium substantially all the potential observed is the streaming potential across the filter cake. This potential is observed and may be measured at various depths in the well in order to determine how this potential is related to pressure and to temperature, since temperature also usually increases with depth. The hydrostatic pressure at any depth may be computed from the known density of the mud or may be measured by means of a recording gauge. The variation of this potential with depth may be observed and from it the average streaming potential in millivolts/100 p. s. i. may be deduced from the known mud weight. At the same time a check is obtained on the linearity or otherwise of the pressure differential versus streaming potential relationship. A correction may then be applied to the self-potential curve taking into consideration the difference is hydrostatic head under which the self-potential log was observed and the appropriate temperature. Generally the temperature correction is small compared with the pressure correction.

Referring to Figure 1, there is shown an apparatus which may be used to log the streaming potential of mud in a borehole according to the method of my invention. The apparatus comprises a hollow dome-shaped container 1 which is fastened on the end of a cable 2, and arranged so that the apparatus may be lowered into the borehole. The cable 2 contains at least two insulated electrical conductors whose purpose will become evident later. The cable may be fastened to the container 1 by means of a cable connector and stuffing box 3. The container 1 is sealed tightly at its upper end and its lower end may be open as at 4. Fitted against the shoulder 5 on the outer diameter of the dome 1 is a fluid-permeable porous tube 6 of alundum, unglazed porcelain or other electrically non-conductive fluid-pervious material. The bottom of the porous cylinder 6 is closed by a plug 7. The plug 7 as well as the dome 1 are conveniently made of electrically-insulating material such as Bakelite or other plastic which is impervious to drilling fluid. The dome 1 is substantially air-tight except at its lower opening 4, access to the interior space being available only through the pores of permeable cylinder 6.

If the dome 1 together with the porous cylinder 6 and plug 7 are lowered into a well so that there is a fluid pressure outside of the cylinder 6, there will be a tendency for the mud filtrate to pass through the porous cylinder 6 and enter the interior space. Furthermore, in doing so the mud will build up on the outside of porous cylinder 6 a mud cake 13 similar in all respects to the mud cake which the drilling fluid forms on the walls of the borehole. Thus the apparatus substantially reproduces the conditions existing at the formation wall. The streaming-potential effect will be proportional to the pressure difference between the outside and the inside of the container, and this is directly related to the depth of immersion or the hydrostatic pressure in the borehole.

The container 1 is made sufficiently large so that the relatively small amount of mud filtrate which enters the vessel causes substantially no change in the interior pressure. That is, it is assumed that the internal pressure is substantially one atmosphere since the vessel 1 was initially full of air at atmospheric pressure. In streaming through the mud cake 13 and the porous cylinder 6 the mud filtrate sets up the well-known electro-filtration or streaming potential which manifests itself as a potential difference between the inner face of cylinder 6 and the outer face of the mud 13.

In order to measure the streaming potential thus set up, there is placed adjacent the inner wall of cylinder 6 a lead/lead chloride electrode 8 made in the form of a perforated cylinder closely fitting the inside of the porous cylinder 6. Such a lead/lead chloride electrode is electrically non-polarizing. The cylindrical electrode 8 has perforations 9 which allow the mud filtrate which has passed through the porous cylinder 6 to enter the container with substantially no further obstruction. The lead/lead chloride electrode 8 is connected by means of insulated wire 10 passing through the wall of the container 1 to one of the conductors of cable 2. A second lead/lead chloride electrode 11 is mounted on the outside of container 1 substantially concentric with electrode 8. The electrode 11 may be held in place by means of electrically-insulating fasteners (not shown) and protected mechanically by a perforated electrically non-conducting sleeve (not shown). The electrode 11 is connected by means of insulated wire 12 passing through the wall of the chamber 1 to another conductor in the cable 2. The potential difference between electrodes 8 and 11 may therefore be observed by means of a potentiometer, usually of the recording type, which is located at the surface and connected to the conductors in cable 2 as is customary in electric-logging procedure. The observed potential will be the streaming potential which is set up by the flow of mud filtrate through the porous cylinder 6 and the mud cake 13. It is assumed that there is no ohmic potential drop between the two electrodes caused by electro-chemical or extraneous currents. This assumption is a reasonable one to make if the two electrodes 8 and 11 are reasonably close together, for example as indicated in Figure 1.

The apparatus of Figure 1 is attached to the logging cable 2 and lowered into the borehole below the surface of fluid standing in the hole. As the apparatus is lowered a record is made of its depth and of the potential measured. The mud density is also recorded as well as the fluid level in the borehole.

Figure 2 shows a typical log of the mud streaming potential at various depths as obtained in the manner of my invention and by means of the apparatus of Figure 1. Plotted from left to right is the observed potential in millivolts, while from the top of the chart downward is plotted depth of immersion in the drilling fluid. The depth may be expressed either in feet or in terms of pressure differential computed from the known density of the drilling mud. If the well is full of mud to the top the depth of immersion may be the same as depth in the well, but if the well is not standing full of mud the zero of the vertical scale is at the top of the mud column. A typical pressure-differential scale is shown by way of example, but this scale will be related to depth in a different way for different weights of mud. The curve 15 represents the plot of observed potential and it is apparent that the quantity indicated by $E_s'$ is the streaming potential across the filter cake of the drilling mud per 100 ft. of immersion, and the quantity indicated by $E_s$ is the streaming potential across the filter cake of the mud per 100 p. s. i. pressure difference.

At the time the self-potential log is taken in the well, the operator may measure and record the mud density and the height of mud column standing in the well as well as the amount of any extraneously-applied pressure. From these data the operator may compute the pressure tending to cause the mud fluid to produce a streaming potential at each formation in the well during the taking of the self-potential log. Then from the observed $E_s$ or $E_s'$ determined by the method and apparatus of my invention, the operator may compute the necessary correction to the observed self-potential log for each formation traversed by the log.

By the term streaming potential as used herein and in the appended claims is meant the electric potential arising from the phenomena of electro-filtration when an electrolyte is forced to flow through a permeable medium. The filtrate of commonly-employed aqueous drilling muds is such an electroyte. The term filtrate or mud filtrate as herein used means the liquid which would pass through the filter whenever the drilling mud is filtered.

While I have described my invention as used when the borehole fluid is drilling mud, the method and apparatus of my invention may be used to determine the streaming potential characteristics of any aqueous liquid found in a borehole which gives rise on filtration to a permeable filter cake.

What I claim as my invention is:

1. A method of determining the streaming-potential characteristics of mud fluid in a borehole which comprises filtering the fluid at various levels in the borehole through its own filter cake under a pressure differential which is in proportion to the depth in the fluid, and measuring the resulting streaming potential and the depth in the fluid.

2. A method of determining the streaming-potential characteristics of mud fluid in a borehole which comprises placing a hollow container at various depths in the fluid in the borehole, filtering the fluid into the container from the borehole under the hydrostatic pressure existing therein, measuring the resulting electro-filtration potential, and simultaneously measuring the depth of the container in the fluid.

3. Apparatus for measuring the streaming potential of fluid in a borehole which comprises a hollow electrically-nonconducting container, an electrically-nonconducting filter medium forming a portion of the wall of said container, an electrode inside said container, an electrode outside said container and adjacent said inside electrode, electrically-insulated means for leading the potential difference between said electrodes to a point of measurement, and means for lowering said container into the borehole.

4. Apparatus for measuring the streaming potential of fluid in a borehole which comprises a hollow electrically-nonconducting container, an electrically-nonconducting filter medium forming a portion of the wall of said container, a perforated non-polarizing first electrode on the inner wall of said filter medium, a similar non-polarizing second electrode on the outer wall of said container adjacent to said first electrode, electrically-insulated means for leading the potential difference between said electrodes to a point of measurement, and means for lowering said container into the borehole.

MALCOLM R. J. WYLLIE.

REFERENCES CITED

The following references are of record in the file of this patent:

UNITED STATES PATENTS

| Number | Name | Date |
|---|---|---|
| 1,913,293 | Schlumberger | June 6, 1933 |
| 1,970,342 | Schlumberger | Aug. 14, 1934 |
| 2,475,353 | Doll | July 5, 1949 |
| 2,475,354 | Doll | July 5, 1949 |

OTHER REFERENCES

"Review of Scientific Instruments," vol. 19, No. 10, October 1948, pages 640–646 (photo copy in 75/398).